United States Patent
Atta et al.

(10) Patent No.: US 8,961,051 B2
(45) Date of Patent: Feb. 24, 2015

(54) DEVICE FOR TAPPING AND INOCULATING TREES

(71) Applicant: King Saud University, Riyadh (SA)

(72) Inventors: Hashim Ali El Atta, Riyadh (SA); Ibrahim Mohamed Aref, Riyadh (SA); Abdurrahman Ali Alazba, Riyadh (SA); Sayeda Ali Ahmed Khalil, Riyadh (SA); Kareem Khaled Mohamed, Riyadh (SA)

(73) Assignee: King Saud University, Riyadh (SA)

( * ) Notice: Subject to any disclaimer, the term of this patent is extended or adjusted under 35 U.S.C. 154(b) by 177 days.

(21) Appl. No.: 13/717,568

(22) Filed: Dec. 17, 2012

(65) Prior Publication Data

US 2014/0169858 A1    Jun. 19, 2014

(51) Int. Cl.
*A01G 23/12* (2006.01)
*A01G 7/06* (2006.01)

(52) U.S. Cl.
CPC . *A01G 23/12* (2013.01); *A01G 7/06* (2013.01)
USPC ............. 401/195; 7/158; 30/121; 139/DIG. 8

(58) Field of Classification Search
CPC ............................... A01G 23/10; A01G 23/12
USPC ................... 7/158; 30/121, 169, 171, 296.1; 239/DIG. 8; 408/61
See application file for complete search history.

(56) References Cited

U.S. PATENT DOCUMENTS

| | | | |
|---|---|---|---|
| 2,591,716 A | 4/1952 | Murphy |
| 2,645,058 A | 7/1953 | Dukes et al. |
| 2,725,674 A | 12/1955 | Burney |
| 2,932,127 A | 4/1960 | Prance et al. |
| 3,086,287 A | 4/1963 | Cook |
| 3,121,974 A | 2/1964 | Brantley et al. |
| 3,359,651 A | 12/1967 | Clements |
| 3,986,259 A | 10/1976 | McReynolds et al. |
| 4,924,571 A | 5/1990 | Albertson |

FOREIGN PATENT DOCUMENTS

| | | |
|---|---|---|
| SU | 986351 | 1/1983 |
| SU | 1586612 A1 | 8/1990 |

OTHER PUBLICATIONS

Gum Arabic, Wikipedia.org website.

*Primary Examiner* — David Walczak
*Assistant Examiner* — Joshua Wiljanen
(74) *Attorney, Agent, or Firm* — Richard C. Litman

(57) ABSTRACT

The device for tapping and inoculating trees includes an elongate, main arm having an actuating mechanism attached to one end and a housing attached to the opposite end. A cutting mechanism extends from one side of the housing and a spray system is disposed in a recess in the housing. A universal actuator operates both the cutting mechanism and the spray system upon activation by the actuating mechanism. The cutting mechanism taps or scrapes the bark off the target branch and the spray system sprays a solution that stimulates the tapped area into producing more sap and sap of higher quality.

9 Claims, 3 Drawing Sheets

DEVICE FOR TAPPING AND INOCULATING TREES

BACKGROUND OF THE INVENTION

1. Field of the Invention

The present invention relates to apparatus for spraying or inoculating trees, and particularly to a device for tapping and inoculating trees that can be used to treat the tree with biosubstances to enhance the quantity and quality of gums or resins harvested from the trees.

2. Description of the Related Art

Gum Arabic is a natural gum made from hardened sap. This sap is produced by two species of acacia trees, *Acacia senegal* and *Acacia seyal*. There are many uses for gum Arabic ranging from food, art, cosmetics, pyrotechnics to medicine, but gum Arabic is most prevalently used in the food industry.

Gum Arabic is mainly harvested in the Middle East and West Asia. While current production appears to be level with demand, recent studies have shown that the trees can be made to produce even more than the normal amount of gum Arabic sap. To harvest the hardened sap, the farmer typically taps the branches of the tree with a sharp instrument, which forces the tree to exude sap, a viscous liquid substance, as a natural reaction to the injury and recovery therefrom. It has been noticed that when a certain beetle alights on the tapped surface of *Acacia senegal* for a certain amount of time, the amount of sap being exuded was higher than normal. The present inventors have performed in vitro experiments that show that inoculation of the tapped branches of *Acacia senegal* with a fungus and a bacterium, either individually or in combination, increased gum Arabic production and improved its quality substantially as compared to tress that were not inoculated.

However, there is a need for simple and practical equipment that can simultaneously tap and inoculate the branches of *Acacia senegal* to produce gum Arabic. Thus, a device for tapping and inoculating trees is desired.

SUMMARY OF THE INVENTION

The device for tapping and inoculating trees includes an elongate, main arm having an actuating mechanism attached to one end and a housing attached to the opposite end. A cutting mechanism extends from one side of the housing and a spray system is disposed in a recess in the housing. A universal actuator operates both the cutting mechanism and the spray system upon activation by the actuating mechanism. The cutting mechanism taps or scrapes the bark off the target branch and the spray system sprays a solution that stimulates the tapped area into producing more sap and sap of higher quality.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
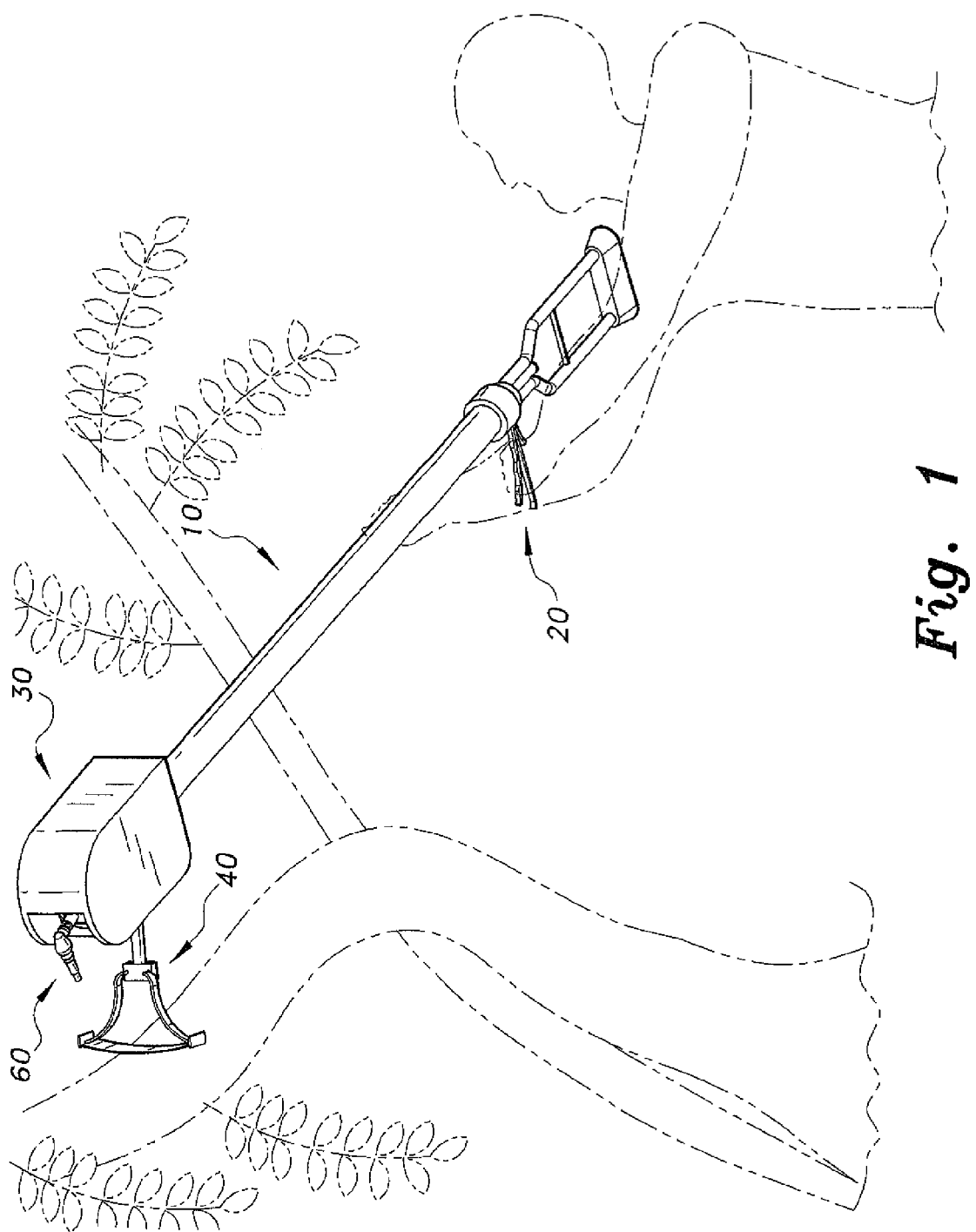
FIG. 1 is a device for tapping and inoculating trees according to the present invention.

The device for tapping and inoculating trees is a combination tap/spray tool 10 for tapping the branches of trees, particularly *Acacia senegal*, and spraying or inoculating the tapped area with a fungus and/or bacteria or other biosubstance to increase sap production and increase quality. In the exemplary embodiment shown in FIGS. 1 and 2, the tap/spray tool 10 is a manual or handheld tool. However, it is to be understood that the features thereof can be applied to automated machines or harvesters. The tap/spray tool 10 includes an elongate, hollow main arm, bar or beam 12 with an actuating mechanism 20 at one end and a chassis or housing 30 detachably mounted at the other end. The housing 30 supports a spray system 60 thereon and a cutting mechanism 40 extends from the housing 30.

The main arm 12 is preferably, but not limited to, about 1.5 meters in length, long enough to reach most of the desired height and areas of a tree branch system. The main arm 12 can include other lengths for reaching higher or lower areas. As an alternative, the main arm 12 can be configured as a telescoping arm that can be selectively fixed at preselected lengths. In the non-limiting exemplary embodiment, the main arm 12 is constructed from a PVC tube. Other materials, such as wood, metals, other plastics and combinations thereof, may also be used to make the tubular structure. While the main arm 12 provides an extension for reaching branches, the main arm 12 is also hollow to surround a cable or wire 11 utilized to actuate the cutting mechanism 40.

Due to the weight of the housing 30, along with the cutting mechanism 40 and the spray system 60 thereon, at one end of the main arm 12, operation of the tap/spray tool 10 can be cumbersome for the user. In order to alleviate some of the difficulty in handling the tap/spray tool 10 due to the imbalanced weight distribution, the opposite end of the main arm 12 includes a shoulder brace or support 14. The shoulder brace 14 is mounted to the main arm 12 by a flexible joint 16. The flexible joint 16 can be a biased joint or any other joint that allows some degree of pivoting movement between the shoulder brace 14 and the main arm 12. The pivoting movement can be freely moving, fixed or at fixed intervals. This permits the user to maneuver the housing 30 with less difficulty and more accuracy. To insure relative comfort through extended use, the shoulder brace 14 can include a padded shoulder rest or pad 15.

The operation of the cutting mechanism 40 and the spray system 60 is facilitated by the actuating mechanism 20. The actuating mechanism 20 includes a support bar or beam 22 where the user may rest the palm of the hand. A pull or hand lever 24 is pivotally attached to the support bar 22. When the user pulls the hand lever 24, the movement of the hand lever 24 pulls the cable 11 attached to the lever 24 at one end. The other end of the cable 11 is attached to one of the operating bars for moving the cutting mechanism 40, the details of which will be further discussed below.

Figure 2:
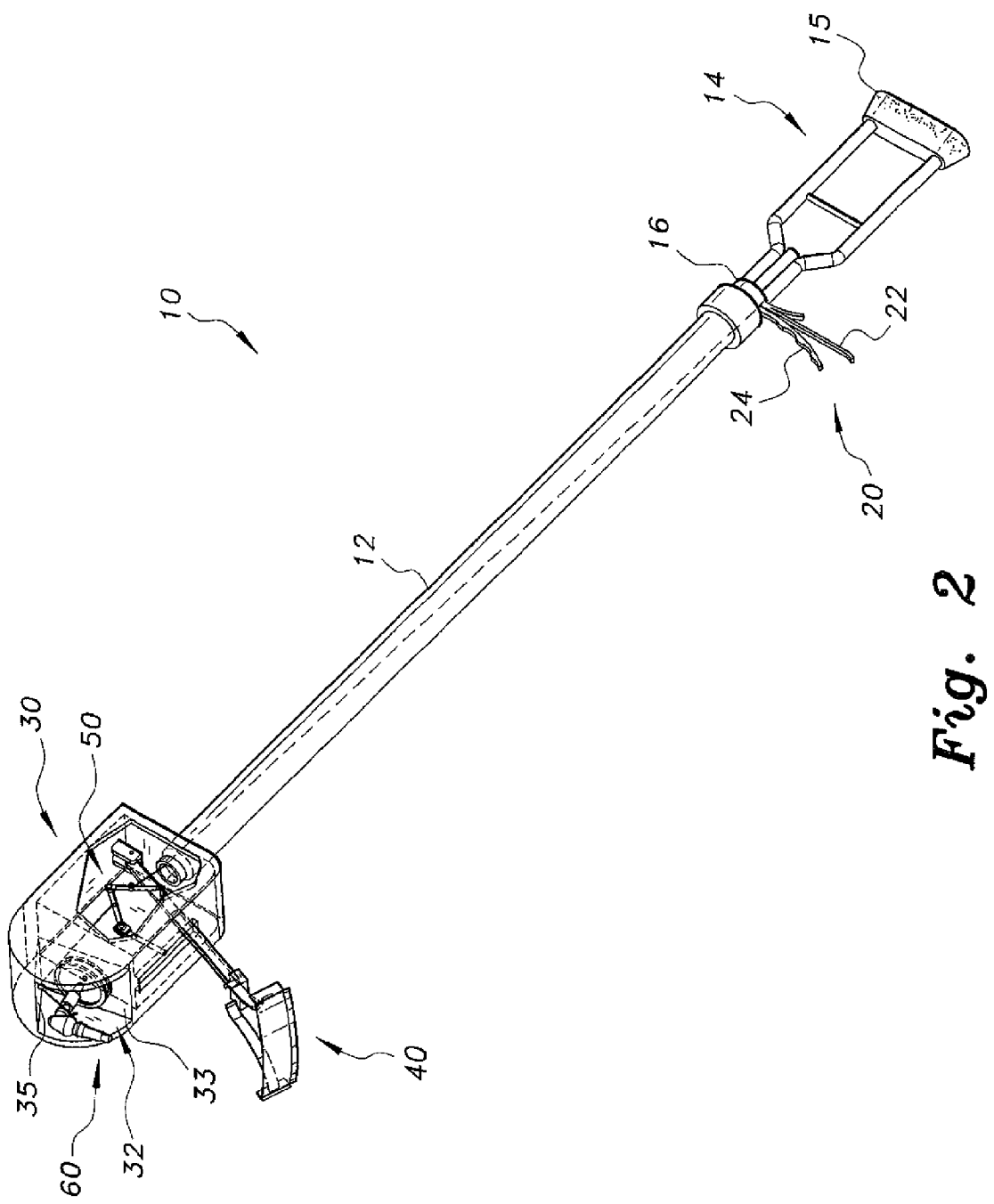
FIG. 2 is a perspective view of the device for tapping and inoculating trees of FIG. 1, shown with part of housing broken away to show the interior thereof.

As shown in FIGS. 1 and 2, the housing 30 is a substantially hollow box-like structure with a spray system support recess or cavity 32 formed at the top and an opening 34 formed at one side of the housing 30. The support recess 32 provides space for mounting the spray system 60 and the components for actuating the spray system 60. The main support surface or base 33 can be sloped or slightly angled with respect to horizontal for mounting and aiming the spray system 60 at the desired angle. Alternatively, the base 33 can be a pivoting panel to facilitate finer adjustments. The side opening 34 can be an elongate, rectangular opening providing sufficient room for the cutting mechanism 40 to extend from the housing 30 and permit the desired movement of the cutting mechanism 40. Other shapes, sizes and lengths can be applied to form the side opening 34.

Figure 3:
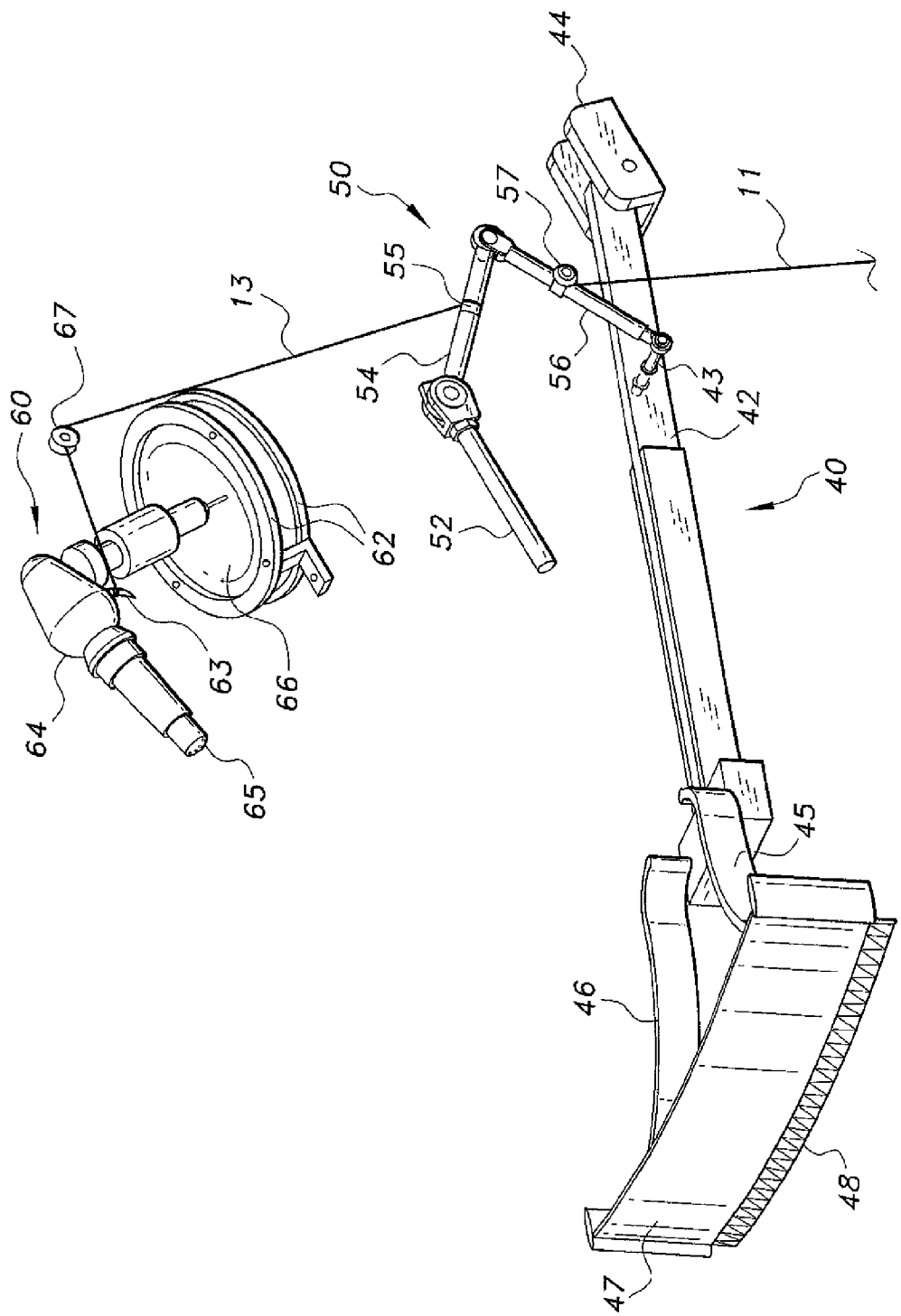
FIG. 3 is a perspective view of the cutting mechanism, the spray system, and the universal actuator of the device for tapping and inoculating trees of FIG. 1, the housing being omitted.

As shown in FIGS. 2 and 3, the cutting mechanism 40 includes an elongate cutter aim, beam or bar 42 pivotally mounted inside the housing 30 by a pivot mount bracket 44 at one end. The cutter arm 42 extends through the side opening 34. The other end of the cutter arm 42 includes outwardly extending bars 45, 46 forming a yoke for mounting a blade or cutter 47 thereon. The cutter arm 42 and the mounting arms 45, 46 form a substantially Y-shaped yoke, the cutter 47 being disposed between the mounting arms 45, 46. The cutter 47 includes a cutting edge 48 for scraping bark off the branches B of the tree T. To facilitate movement of the cutter arm 42, the cutter arm 42 includes an actuating pivot axle 43 operatively attached to a universal actuator 50. The cutter 47 can be a curved flat blade and the cutter edge 48 can be a scraping edge. Alternatively, the cutter 47 can include a plurality of projecting teeth to form an edge capable of both punching and scraping.

The movement of the cutting mechanism 40 is facilitated by the universal actuator 50 upon activation by the actuating mechanism 20. The universal actuator includes a fixed beam 52 affixed to the interior wall of the housing 30 on the same side as the opening 34. One end of a first actuator rod 54 is pivotally attached to the fixed beam 52 while the other end of the first actuator rod 54 is pivotally attached to one end of a second actuator rod 56. The other end of the second actuator rod 56 is pivotally connected to the actuating pivot axle 43. As shown in FIG. 3, a cable attachment bracket 57 is attached to the second actuator rod 56, where one end of the cable 11 is attached. The pivoting movements of the first and second actuator arms 54, 56 are constrained only by their respective connections to the fixed beam 52 and the actuating pivot axle 43. Upon pulling the cable 11 by actuating the hand lever 24, the second actuator 56 pivots with respect to the first actuator 54, forcing the cutter arm 42 to pivot downward with respect to the pivot mount bracket 44 via the actuating pivot axle 43. The universal actuator 50 also facilitates operation of the spray system 60, which will be further explained below.

As shown in FIGS. 2 and 3, the spray system 60 includes a sprayer mounting bracket 62 for securely holding and mounting a spray gun 64 and container 66 onto the base 33. The container 66 may include a select amount of fungus and/or bacterium or other bio substance in solution form that simulates the biological interaction observed from the beetle alighting on the exposed surface of a tapped area as mentioned above. The spray gun 64 is operatively attached to the container 66 and includes a nozzle 65 through which the contents of the container are expelled. In order to operate the spray gun 64, the spray gun 64 includes a trigger 63 extending downward from the main body of the spray gun 64. An actuating cable 13 includes one end operatively attached to the first actuator rod 54 at a cable attachment bracket 55 fixed to the first actuator rod 54. The actuating cable 13 is threaded through a pulley 67 fixed to the back wall 35 in the recess 32. The other end of the actuating cable 13 is operatively attached to the trigger 63. In operation, a pull on the cable 11 by the hand lever 24 causes the second actuator 56 to pivot in the manner mentioned above. The movement of the second actuator 56 also causes the first actuator 54 to pivot generally downward with respect to the fixed beam 52. This, in turn, pulls the actuating cable 13 down, which pulls the trigger 63 to spray the contents of the container 66 onto the target area. Because of the lever arrangement of the actuator rods 52, 56 and cables 11, 13, the trigger 63 is pulled after the cutter 47 has tapped the tree branch, so that the biosubstance is sprayed into the tapped branch, although both actions are actuated by the same pull of the hand lever 24.

It is to be understood that the tap/spray tool 10 encompasses a variety of alternatives. For example, the function of the pulley 67 may be facilitated by a lever mechanism in which a pull on side of the lever causes a corresponding pull on a cable attached to the other side.

It is to be understood that the present invention is not limited to the embodiments described above, but encompasses any and all embodiments within the scope of the following claims.

We claim:

1. A device for tapping and inoculating trees, comprising:
- an elongate, hollow main arm having opposing ends;
- an actuating mechanism attached to one of the ends of the main arm;
- a housing connected to the end of the main arm opposite the actuating mechanism, the housing having a main hollow interior and having a recess on a top portion of the housing above the main hollow interior, the housing also having a side opening;
- a cutting system extending through the side opening of the housing, the cutting system having a cutter adapted for tapping the tree;
- a spray system detachably mounted in the recess, the spray system being adapted for spraying a solution containing a biosubstance for stimulating increased sap production; and
- a universal actuator operating both the cutting system and the spray system upon activation by the actuating mechanism, the universal actuator facilitating substantially concurrent activation of the spray system and the cutting system in order to spray the biosubstance into the tapped tree branches.

2. The device for tapping and inoculating trees according to claim 1, further comprising a shoulder brace for comfortably supporting the device during use, the shoulder brace being connected to the actuating mechanism end of said main arm.

3. The device for tapping and inoculating trees according to claim 2, wherein said shoulder brace includes a shoulder pad and a flexible joint for flexible connection to said main arm.

4. A device for tapping and inoculating trees, comprising:
- an elongate, hollow main arm having opposing ends;
- an actuating mechanism attached to one of the ends of the main arm;
- a housing connected to the end of the main arm opposite the actuating mechanism, the housing having a main hollow interior and having a recess on a top portion of the housing above the main hollow interior, the housing also having a side opening;
- a cutting system extending through the side opening of the housing, the cutting system having a cutter adapted for tapping tree branches;
- a spray system detachably mounted in the recess, the spray system being adapted for spraying a solution containing a biosubstance for stimulating increased sap production; and
- a universal actuator operating both the cutting system and the spray system upon activation by the actuating mechanism, the universal actuator facilitating substantially concurrent activation of the spray system and the cutting system in order to spray the biosubstance into the tapped tree branches;

wherein the actuating mechanism comprises;

a support bar adapted for resting a user's palm;

a hand lever pivotally mounted to the support bar;

a lever mechanism connected to the cutting system, the lever mechanism forming a part of the universal actuator;

a first cable extending between the hand lever and the lever mechanism; and a second cable extending between the lever mechanism and said spray system.

5. The device for tapping and inoculating trees according to claim 4, wherein said cutting mechanism comprises:

an elongate cutter arm having first and second ends, the first end being pivotally mounted inside the housing;

a pair of outwardly extending mounting arms extending from the second end of the cutter arm;

a cutter blade disposed between the mounting arms, the cutter blade having a cutting edge adapted for tapping and scraping bark off trees and branches; and an actuating pivot axle disposed intermediate the first and second ends of the cutter arm.

6. The device for tapping and inoculating trees according to claim 5, wherein said lever mechanism comprises:

a fixed beam having opposite ends, one of the ends of the fixed beam being affixed to an interior wall of the housing;

a first actuator rod having first and second ends, the first end being pivotally attached to the end of the fixed beam opposite the housing end;

a second actuator rod having third and fourth ends, the third end being pivotally attached to the second end of the first actuator rod and the fourth end being pivotally connected to said actuating pivot axle, said first cable being attached to the second actuator rod;

wherein a pull on said first cable pulls the second actuator rod, thereby causing said cutter arm to pivot.

7. The device or tapping and inoculating trees according to claim 6, wherein said spray system comprises:

a sprayer mounting bracket detachably mounted in the recess in said housing;

a sprayer container securely held and mounted in the sprayer mounting bracket;

a spray gun mounted atop the container, the spray gun having a nozzle for expelling solution from the container, the spray gun having a trigger; and a pulley affixed to a wall of the recess, the second cable having one end operatively connected to said first actuator rod, the cable extending over the pulley and having a second end attached to the trigger;

wherein a pull on said first cable pulls the second actuator rod, thereby causing said first actuator rod to also pivot and thereby pull the trigger, the trigger being pulled after said cutter blade is actuated to tap the tree branch.

8. A device for tapping and inoculating trees, comprising:

an elongate, hollow main arm having opposing ends;

an actuating mechanism attached to one of the ends of the main arm;

a housing connected to the end of the main arm opposite the actuating mechanism, the housing having a main hollow interior and having a recess on a top portion of the housing above the main hollow interior, the housing also having a side opening;

a cutting system extending through the side opening of the housing, the cutting system having a cutter adapted for tapping the tree; and a spray system detachably mounted in the recess, the spray system including a solution for stimulating increased sap production, wherein the solution includes a biosubstance, the actuating mechanism being coupled to the cutting system and the spray system to facilitate substantially concurrent activation of the spray system and the cutting system in order to spray the biosubstance into the tapped tree.

9. The device for tapping and inoculating trees according to claim 8, wherein the biosubstance is selected from the group consisting of fungus, bacterium, and combinations thereof.

* * * * *